(12) United States Patent
John

(10) Patent No.: US 7,052,263 B2
(45) Date of Patent: May 30, 2006

(54) APPARATUS FOR MANUFACTURING A THREE-DIMENSIONAL OBJECT

(75) Inventor: Hendrik John, Hünxe (DE)

(73) Assignee: Envisiontec GmbH, Marl (DE)

( * ) Notice: Subject to any disclaimer, the term of this patent is extended or adjusted under 35 U.S.C. 154(b) by 370 days.

(21) Appl. No.: 10/125,038

(22) Filed: Apr. 18, 2002

(65) Prior Publication Data

US 2002/0155189 A1   Oct. 24, 2002

(30) Foreign Application Priority Data

Apr. 20, 2001   (DE) ........................... 201 06 887 U

(51) Int. Cl.
    B29C 35/08  (2006.01)
(52) U.S. Cl. .................................. 425/174.4
(58) Field of Classification Search ............. 425/174.4; 264/401
    See application file for complete search history.

(56) References Cited

U.S. PATENT DOCUMENTS

| | | | | |
|---|---|---|---|---|
| 5,143,663 A | * | 9/1992 | Leyden et al. ................. | 264/22 |
| 5,173,266 A | * | 12/1992 | Kenney ....................... | 422/100 |
| 5,236,637 A | * | 8/1993 | Hull ............................. | 264/22 |
| 5,248,456 A | * | 9/1993 | Evan, Jr. et al. ............... | 264/22 |
| 5,298,208 A | * | 3/1994 | Sibley et al. .................. | 264/51 |
| 5,391,072 A | * | 2/1995 | Lawton et al. ........... | 425/174.4 |
| 5,447,822 A | * | 9/1995 | Hull et al. .................. | 430/269 |
| 5,545,367 A | * | 8/1996 | Bae et al. .................... | 264/401 |
| 6,027,324 A | | 2/2000 | Hull | |
| 6,051,179 A | * | 4/2000 | Hagenau ...................... | 264/401 |
| 6,158,946 A | * | 12/2000 | Miyashita .................... | 414/411 |
| 2001/0028495 A1 | * | 10/2001 | Quate et al. ................ | 359/298 |
| 2001/0048183 A1 | * | 12/2001 | Fujita .......................... | 264/401 |

FOREIGN PATENT DOCUMENTS

| | | |
|---|---|---|
| DE | 93 19 405 U1 | 5/1994 |
| JP | 08192469 | 7/1996 |

* cited by examiner

*Primary Examiner*—Duane Smith
*Assistant Examiner*—Emmanuel S. Luk
(74) *Attorney, Agent, or Firm*—George W. Neuner; Edwards Angell Palmer & Dodge LLP

(57) ABSTRACT

An apparatus (1) for manufacturing a three-dimensional object (13) includes a trough (7) for holding material (11) which can be solidified under the influence of light. The trough (7) has on its lower side a transparent plate (8). On the transparent plate (8) and side wall (10) of the trough (7) is provided a resilient layer (9) from which solidified material is easier to detach than from the transparent plate (8). An exposure and projection unit (19) serves to expose and solidify the material (11) in the trough (7) from below through the transparent plate (8).

11 Claims, 1 Drawing Sheet

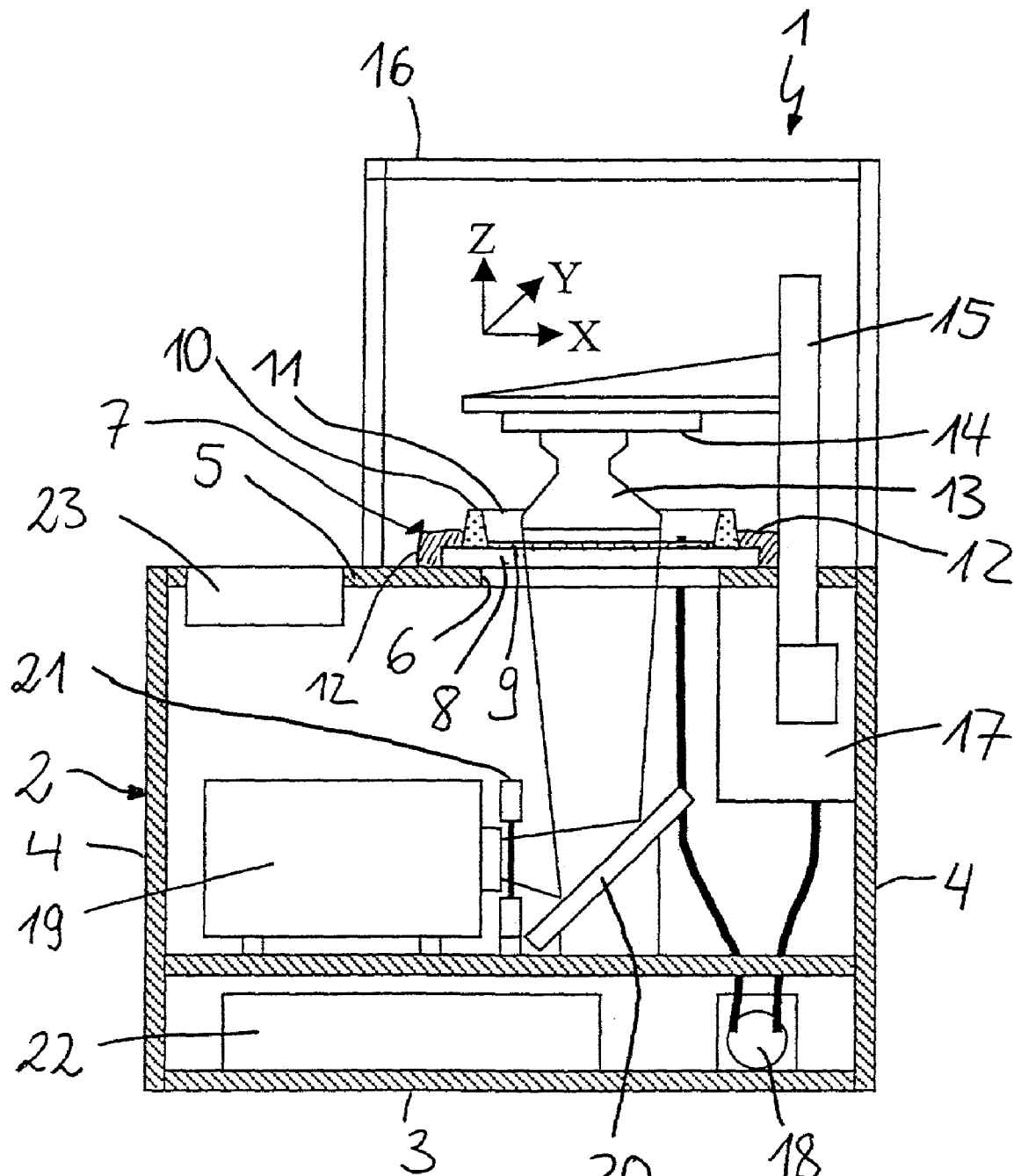

US 7,052,263 B2

APPARATUS FOR MANUFACTURING A THREE-DIMENSIONAL OBJECT

FIELD OF THE INVENTION

The invention concerns an apparatus for manufacturing a three-dimensional object by solidifying in layers a liquid material which can be solidified under the influence of light at locations corresponding to the cross-section of the object, with a trough for holding the material, a light source, a device for projecting the area to be exposed onto the surface according to the cross-section of the object to be solidified, a positioning device for positioning the object to be formed relative to the trough, wherein the surface of the material to be exposed is covered by a transparent plate and the transparent plate which is provided in the bottom of the trough.

BACKGROUND OF THE INVENTION

German Patent document 93 19 405 U1 describes an apparatus for manufacturing a three-dimensional object by solidifying in layers a liquid material which can be solidified under the influence of light at locations corresponding to the cross-section of the object, with a trough for holding the material, a light source, a device for projecting the area to be exposed onto the surface according to the cross-section of the object to be solidified, a positioning device for positioning the object to be formed relative to the trough, wherein the surface of the material to be exposed is covered by a transparent plate and the transparent plate which is provided in the bottom of the trough.

It is the object of the invention to provide an apparatus for manufacturing a three-dimensional object which exhibits improved practical handling capacity and therefore allows greater productivity.

SUMMARY OF THE INVENTION

The present invention provides an apparatus for manufacturing a three-dimensional object by solidifying in layers a liquid material (11) which can be solidified under the influence of light at locations corresponding to the cross-section of the object (13), with a trough (9, 10, 8; 7) for holding the material, a light source (19), a device (19) for projecting the area to be exposed onto the surface according to the cross-section of the object to be solidified, a positioning device (15) for positioning the object to be formed relative to the trough, wherein the surface of the material to be exposed is covered by a transparent plate (8) and the transparent plate is coated with a material to which the solidified material sticks less than to the transparent plate, characterised in that the bottom of the trough and the side trough walls (10) are formed by the layer (9).

The present invention also provides an apparatus for manufacturing a three-dimensional object by solidifying in layers a liquid material (11) which can be solidified under the influence of light at locations corresponding to the cross-section of the object (13), with a trough (9, 10, 8; 7) for holding the material, a light source (19), a device (19) for projecting the area to be exposed onto the surface according to the cross-section of the object to be solidified, a positioning device (15) for positioning the object to be formed relative to the trough, wherein the surface of the material to be irradiated is covered by a transparent plate which is provided in the bottom of the trough, characterised in that the device for projecting the area to be exposed comprises a projector with micro-mirror array technology.

Preferred embodiments of the invention also provide one or more of the following:

i) the layer (9) is resilient;

ii) the transparent plate (8) and the trough-shaped layer (9) in the apparatus form an exchangeable unit (7);

iii) the transparent plate (8) forms the bottom of the trough and in that exposure is effected from below;

iv) the projection device (19) comprises a multimedia projector with micromirror array technology or with a liquid crystal display;

v) the height of the trough can be less than the height of the object (13) to be formed;

vi) an electromechanical closure (21) is provided for controlling the duration of exposure; and/or vii) the light source essentially emits in the visible spectrum.

BRIEF DESCRIPTION OF THE DRAWING

There follows a description of a practical example of the invention with the aid of the FIGURE.

The FIGURE shows a schematic sectional view of the apparatus.

DETAILED DESCRIPTION OF THE INVENTION

The apparatus 1 for manufacturing a three-dimensional object comprises a housing 2 with a bottom 3, side walls 4 and a top wall 5. In the top wall 5 is provided an aperture 6. Outside the housing 2 is arranged a polymerisation trough unit 7 covering the aperture 6. The polymerisation trough unit 7 consists of a bottom plate 8 which is transparent to visible light and which has slightly larger dimensions than the aperture 6, so that the latter is completely covered. The transparent bottom plate 8 is for example made of glass or plexiglass. On the side of the transparent bottom plate 8 facing away from the aperture 6 is mounted a resilient layer 9 forming the actual polymerisation trough 7, for example in the form of a silicone coating, which extends over the region of the transparent bottom plate 8 covering the aperture 6 and which at its edge 10 projects from the transparent plate 9, so that the edge simultaneously forms the edge of a polymerisation trough for holding a liquid material 11 which is polymerisable under the influence of light. It is crucial that the resilient layer 9 is made of a material to which the polymerisable material 11 sticks less than to the transparent bottom plate 8 after polymerisation. The height of the edge is in this embodiment approximately a few millimeters. The transparent bottom plate 8 and the resilient dividing layer 9 designed as a polymerisation trough 7 are connected to each other by fastening elements 12 and fixed as the polymerisation trough unit 7 to the top wall 5 of the housing 2. The fixing here is such that the polymerisation trough unit 7 is easy to remove and exchange. To hold the object 13 to be formed, there is provided a carrier platform 14 which can be slid up and down in a vertical direction by means of a height adjusting device 15. The carrier platform 14 is designed and controllable in such a way it can be moved from a position at the bottom of the polymerisation trough unit 7 linearly vertically upwards and back again. Further, the carrier platform 14 is made of a material to which the polymerised material from which the object is formed sticks, so that the object 13 to be formed does not come off upon sliding of the carrier platform. Over the polymerisation trough unit 7 and the carrier platform 14 with height adjusting device 15 is provided an opaque hood 16.

In the housing 2 is provided a storage container 17 for the polymerisable material, which is for example constructed in the form of an opaque bag, and which is connected by an opaque pipe to the polymerisation trough unit 7 via a pump 18.

In the housing 2 is also located an exposure and projection unit 19 which contains a light source, not shown, essentially emitting within the visible range, as well as a mask producing device, not shown, which, depending on geometrical layer data, produces a cross-sectional image of the object 13 in each layer and projects it onto the side of the layer 9 facing towards the interior of the trough. The mask producing device is preferably constructed as a digitally controlled mirror system (digital mirror display). This mask producing device, which is known in the art, includes a large number of movable micromirrors on a chip, whose orientation is controllable so that light from the light source striking the chip is deflected in the desired manner, and the image produced by the mirror setting is reproduced on the surface to be exposed. To deflect the light rays emerging from the exposure and projection unit 19 onto the lower side of the transparent bottom plate, a reflector 20 is provided. Further, to control the duration of exposure a stop unit 21 which is for example designed as an electromechanical closure is arranged directly at the exit of the light beam from the exposure and projection unit 19. The exposure and projection unit 19, the height adjusting device 15 and the conveying device 18 are controlled by a central computer unit 22. Manual control is possible via a control module 23.

In operation, first digitalised or half-tone process geometrical layer data of the object 13 to be produced are generated with the aid of known techniques and transmitted to the apparatus 1. The polymerisation trough unit 7 is filled with a monomer which polymerises under the influence of visible light, and the carrier platform 13 is positioned in the trough by the height adjusting device 15 in such a way that between the carrier platform 14 and the transparent bottom plate 8 or dividing layer 9 there remains a precise gap in which liquid monomer is located. Then, with the stop 21 open, the first layer is exposed, wherein the image of the cross-section of the object in the first layer is projected by the exposure and projection unit 19 onto the surface of the liquid adjoining the dividing layer 9. Control of the exposure and projection unit 19 is effected in this case according to the geometrical layer data. Due to exposure, the exposed areas of the first layer harden and stick to the carrier platform 14. The duration of exposure is controlled by means of the stop 21. At the end of the exposure cycle the stop 21 is closed and the carrier platform 14 is moved vertically upwards and positioned for the next layer. In the process the polymerised area of the first layer comes off the layer 9, and new material flows into the free space or gap produced. Now an exposure cycle takes place again according to the cross-section of the object in this layer. The operations described are repeated until the object 13 is finished. Finally the carrier platform 14 with the object is removed from the construction space, and the object is cleaned and separated from the carrier platform 14. If required, the object can be further hardened. After the construction process has taken place, the polymerisation trough unit 7 is removed from the apparatus and cleaned. In the meantime a second polymerisation trough unit can be inserted and thus begun already with the next construction process. Hence the productivity is increased and different materials can be used. Another advantage lies in that, on account of exposure from below, the polymerisation trough can be designed with a low edge. Thus material can be saved, particularly in the case of objects whose height is greater than the edge of the polymerisation trough.

In a modified embodiment, the exposure/projection unit 19 is equipped with a liquid crystal projector (LCD projector) instead of a micromirror system.

The invention claimed is:

1. An apparatus for manufacturing a three-dimensional object by solidifying in layers a liquid material which can be solidified under the influence of light at locations corresponding to the cross-section of the object in a layer, said apparatus comprising:
   a trough for holding the liquid material over a transparent plate;
   a light source;
   a device for projecting an area of light onto a surface of the liquid material in contact with a resilient layer selected from a solid resilient material having the properties of silicone according to a cross-section of the object to solidify the liquid material exposed by the light in accord with the cross-section; and
   a positioning device for positioning the object being formed relative to the trough for forming additional layers of the object;
   the trough comprising a surface layer wherein the solidified material sticks to the surface layer less than to the transparent plate.

2. The apparatus according to claim 1, wherein the trough surface layer is resilient.

3. The apparatus according to claim 1, wherein the transparent plate and the trough form an exchangeable unit.

4. The apparatus according to claim 1, wherein the transparent plate forms the bottom of the trough and exposure of the liquid material is effected from below.

5. The apparatus according to claim 1, wherein the device for projecting comprises a multimedia projector with micromirror array technology or with a liquid crystal display.

6. The apparatus according to claim 1, the trough further comprising a height that can be less than a height of the object to be formed.

7. The apparatus according to claim 1, further comprising an electromechanical closure for controlling a duration of exposure.

8. The apparatus for manufacturing a three-dimensional object according to claim 1, wherein the light source essentially emits in the visible spectrum.

9. An apparatus for manufacturing a three-dimensional object by solidifying in layers a liquid material which can be solidified under the influence of light at locations corresponding to the cross-section of the object in a layer, said apparatus comprising:
   a trough comprising a bottom for holding the liquid material, the bottom comprising a transparent plate;
   a light source;
   a device for projecting an area of light onto a surface of the liquid material in contact with a resilient layer selected from a solid resilient material having the properties of silicone according to a cross-section of the object to solidify the liquid material exposed by the light in accord with the cross-section; and
   a positioning device for positioning the object being formed relative to the trough for forming additional layers of the object;
   wherein the device for projecting the area of light comprises a projector with micromirror array technology.

10. The apparatus for manufacturing a three-dimensional object according to claim 9, wherein the light source essentially emits in the visible spectrum.

11. An apparatus for manufacturing a three-dimensional object by solidifying in layers a liquid material which can be solidified under the influence of light at locations corresponding to the cross-section of the object in a layer, said apparatus comprising:

a trough with a bottom and side walls for holding the liquid material over a transparent plate;

a light source;

a device for projecting light onto a surface of the liquid material to be exposed according to a cross-section of the object to solidify the liquid material exposed by the light in accord with the cross-section and;

a positioning device for positioning the object being formed relative to the trough for forming additional layers of the object, wherein the surface of the liquid material to be exposed is covered by a transparent plate and the transparent plate is coated with a layer of a resilient material to which the solidified material sticks less than to the transparent plate, wherein the bottom of the trough and the side walls of the trough are formed by said layer of a material.

* * * * *